(12) United States Patent
Hartmann

(10) Patent No.: US 7,991,635 B2
(45) Date of Patent: Aug. 2, 2011

(54) MANAGEMENT OF JOB CANDIDATE INTERVIEW PROCESS USING ONLINE FACILITY

(76) Inventor: Larry Hartmann, Wyckoff, NJ (US)

( * ) Notice: Subject to any disclaimer, the term of this patent is extended or adjusted under 35 U.S.C. 154(b) by 1211 days.

(21) Appl. No.: 11/654,084

(22) Filed: Jan. 17, 2007

(65) Prior Publication Data

US 2008/0172284 A1    Jul. 17, 2008

(51) Int. Cl.
*G06Q 10/00* (2006.01)
(52) U.S. Cl. ...................... 705/7.14; 705/7.26
(58) Field of Classification Search ............... 705/11, 705/7.14, 7.26
See application file for complete search history.

(56) References Cited

U.S. PATENT DOCUMENTS

| | | | |
|---|---|---|---|
| 5,884,270 A * | 3/1999 | Walker et al. ................. | 705/321 |
| 5,978,768 A * | 11/1999 | McGovern et al. ........... | 705/321 |
| 6,272,467 B1 * | 8/2001 | Durand et al. ................. | 705/5 |
| 6,289,340 B1 * | 9/2001 | Puram et al. .................. | 1/1 |
| 6,341,267 B1 * | 1/2002 | Taub ........................... | 705/7.14 |
| 6,381,583 B1 * | 4/2002 | Kenney ....................... | 705/26 |
| 6,457,005 B1 * | 9/2002 | Torrey ......................... | 1/1 |
| 7,016,853 B1 * | 3/2006 | Pereless et al. ............... | 705/1.1 |
| 7,184,969 B1 * | 2/2007 | Bonnstetter et al. .......... | 705/7.14 |
| 7,437,309 B2 * | 10/2008 | Magrino et al. .............. | 705/7.14 |
| 2001/0034630 A1 * | 10/2001 | Mayer et al. ................. | 705/7 |
| 2001/0034734 A1 * | 10/2001 | Whitley et al. ............. | 707/104.1 |
| 2001/0039014 A1 * | 11/2001 | Bass et al. ................... | 435/6 |
| 2001/0049674 A1 * | 12/2001 | Talib et al. .................. | 707/1 |
| 2002/0007301 A1 * | 1/2002 | Reuning ..................... | 705/9 |
| 2002/0026452 A1 * | 2/2002 | Baumgarten et al. ...... | 707/104.1 |
| 2002/0046199 A1 * | 4/2002 | Scarborough et al. ........ | 706/21 |
| 2002/0128894 A1 * | 9/2002 | Farenden .................... | 705/8 |
| 2002/0133369 A1 * | 9/2002 | Johnson ...................... | 705/1 |
| 2002/0198765 A1 * | 12/2002 | Magrino et al. ............ | 705/11 |
| 2002/0198766 A1 * | 12/2002 | Magrino et al. ............ | 705/11 |
| 2003/0046207 A1 * | 3/2003 | Torre et al. .................. | 705/36 |
| 2003/0050816 A1 * | 3/2003 | Givens et al. ............... | 705/7 |
| 2003/0078821 A1 * | 4/2003 | Gorur et al. ................. | 705/7 |
| 2003/0182178 A1 * | 9/2003 | D'Elena et al. .............. | 705/11 |
| 2003/0195786 A1 * | 10/2003 | Dewar ....................... | 705/8 |
| 2003/0208393 A1 * | 11/2003 | Younger ..................... | 705/9 |
| 2004/0015388 A1 * | 1/2004 | Royall et al. ................ | 705/10 |

(Continued)

OTHER PUBLICATIONS

Edgeman, Rick L; Williams, Joseph; "Select leaders using a quality management process", Feb. 1998, Quality Progress v31n2 pp. 78-82, Dialog 1581831 02-32820.*

(Continued)

*Primary Examiner* — Jonathan G Sterrett
(74) *Attorney, Agent, or Firm* — Scott Kaliko, Esq.; Kaliko & Associates, LLC

(57) ABSTRACT

A method for managing an interview process of at least one candidate for a job is disclosed. The method includes selecting a list of attributes pertinent to the job and selecting a list of interviewers of the at least one candidate. The method further includes assigning at least one attribute to each interviewer and generating an interview template for each interviewer based on the at least one attribute assigned to each interviewer, wherein an interview template comprises a list of topics to discuss with each candidate. The method further includes scheduling an interview between each interviewer and candidate and allowing each interviewer to submit, via a Web page, feedback describing each candidate's competency in each of the attributes based on the interview between each interviewer and each candidate. The method further includes automatically calculating, for each candidate, a first value based on the feedback received from each interviewer.

1 Claim, 11 Drawing Sheets

U.S. PATENT DOCUMENTS

| | | | | |
|---|---|---|---|---|
| 2005/0080657 | A1* | 4/2005 | Crow et al. | 705/8 |
| 2005/0114279 | A1* | 5/2005 | Scarborough et al. | 706/21 |
| 2006/0053046 | A1* | 3/2006 | Bonnstetter et al. | 705/11 |
| 2006/0235884 | A1* | 10/2006 | Pfenninger et al. | 707/104.1 |
| 2006/0271421 | A1* | 11/2006 | Steneker et al. | 705/9 |

OTHER PUBLICATIONS

Sackett, Paul R; Wanek, James E; "New developments in the use of measures of honesty, integrity, conscientiousness, dependability, trustworthiness, and reliability for personnel selection", Winter 1996, Personnel Psychology v49n4 pp. 787-829, Dialog 1348522 99-97918.*

Sackett, Paul R; Roth, Lawrence, "Multi-stage selection strategies: A Monte Carlo investigation of effects on performance and minority hiring", Autumn 1996, Personnel Psychology v49n3 pp. 549-572, Dialog 01311289 99-60685.*

"TeckChek: IT Skills Testing", May 19, 2001, teckcheck.com, web.archive.org webpage, pp. 1-2.*

"TeckChek: IT Skills Assessements—FAQ Page", Dec. 4, 2000, teckcheck.com, web.archive.org webpage, pp. 1-4.*

"TeckChek: IT and computer programming skills testing—Services Page", Dec. 4, 2000, teckcheck.com, web.archive.org webpage, pp. 1-4.*

"TeckChek Adaptive Technical Proficiency Tests", Dec. 4, 2000, teckcheck.com, web.archive.org webpage, pp. 1-4.*

"TeckChek Private Client Area", Dec. 4, 2000, teckcheck.com, web.archive.org webpage, pp. 1-4.*

McCune, Jenny C; "A few good employees", Apr. 1998, Management Review; 87, 4; ABI/INFORM Global, p. 38.*

Kay, Alan S; "Recruiters embrace the internet", Mar. 20, 2000, InformationWeek, Manhasset, Iss. 778, p. 72, 4 pgs, ProQuest ID, 51374688.*

Useem, Jerry; "For sale online: you", Jul. 5, 1999, Fortune, New York, vol. 140, Iss. 1, p. 67, 7 pgs, ProQuest ID 42420177.*

Tyler, Kathryn; "Put applicants' skills to the test", Jan. 2000, HRMagazine; 45, 1; ABI/INFORM Global, p. 74.*

Callans, Michael; "Using technology to hire the best", Aug. 9, 1999, Canadian HR Reporter; 12, 4, ABI/INFORM Global, p. 14.*

Klara, Robert; et.al.; "Hire Power", May 1, 1999, Restaurant Business, vol. 98, Iss. 9, p. 46, 8 pgs, ProQuest ID 40938888.*

Barner, Robert; "Talent Wars in the executive suite: Six Trends shaping recruitment", May/Jun. 2000, The Futurist, Washington, vol. 34, Iss.3, p. 35, 7 pgs. ProQuest ID 52838859.*

De Corte,Willaim "Recruitment and retention decisions that maximize the utility of a probationary selection to obtain a fixed quota of successful selectees", Summer 1996, Personnel Psychology; 49, 2; ABI/INFORM Global, p. 399.*

Comer, Debra R; "Employee's Attitudes towards fitness-for-duty testing", Spring 2000, Journal of Managerial Issues; 12, 1, ABI/INFORM Global, p. 61.*

Coffee, Karen; et.al.; "State of California: Civil Service testing moves into cyberspace", Summer 1999, Public Personnel Management; 28, 2; ABI/INFORM Global, p. 283.*

Korukonda, Appa Rao; "Cognitive Processes and computer advances in job evaluation: Innovation in Reverse?", Mar. 1996, Revue Canadienne des Sciences de l'Administration, Montreal; vol. 13, Iss. 1 pg. 78, 5 pgs, ProQuest ID 9472121.*

Harvey-Cook; J E; et.al; "Biodata in professional entry-level selection: Statistical scoring of common format applications", Mar. 2000, Journal of Occupational and Organizational Psychology, Leicester, vol. 73, Part 1, p. 103, 16 pgs, ProQuest ID 51976634.*

Bobko, Phillip; et.al.; "Derivation and implications of a meta-analytic matrix incorporating cognitive ability, alternative predictors, and job performance", Autumn 1999, Personnel Psychology; 52, 3; ABI/INFORM Global, p. 561.*

Taylor, Frank A III; Ketcham, Allen F; Hoffman, Darvin; "Personnel evaluation with AHP", 1998, Management Decision v36n10 pp. 679, Dialog 02492369 117543178.*

Ryan, Denise; "Looking behind the resume", May 1, 2000, InfoWorld v22n18 pp. 74-75, Dialog 02021666 53376900.*

Philbrick, Jane H; Bart, Barbara D; Hass, Marcia E; "Pre-employment screening: A decade of change", Jun. 1999, American Business Review v17n2 pp. 75-85, Dialog 01840991 04-91982.*

* cited by examiner

| | 10 Years of Commercial Experience | Direct Experience in Small Business | Good Credit Sense | Street Smart and Aggressive | Hands On Management Style | Technology | Independent Worker | Stress Tolerance | Assertive and Persistent | Detail Orientation |
|---|---|---|---|---|---|---|---|---|---|---|
| John Smith | 6.2 | 10.0 | 7.3 | 6.0 | 5.8 | 9.5 | 7.3 | 8.9 | 10.0 | 7.3 | 5.5 |
| Alan Doe | 6.4 | 9.1 | 9.1 | 6.2 | 8.8 | 6.0 | 5.5 | 6.2 | 8.8 | 10.0 |
| Mark White | 8.8 | 8.9 | 6.0 | 8.9 | 5.5 | 8.9 | 10.0 | 6.0 | 5.5 | 6.2 |
| Jack Johnson | 6.0 | 6.2 | 8.8 | 6.0 | 7.3 | 6.2 | 8.8 | 10.0 | 6.0 | 5.5 |
| Chris Kahn | 7.3 | 8.9 | 5.5 | 10.0 | 8.8 | 10.0 | 6.2 | 5.5 | 9.1 | 10.0 |
| Stan Lee | 9.1 | 6.2 | 8.9 | 9.1 | 6.0 | 5.5 | 9.1 | 6.2 | 6.0 | 7.3 |
| Matthew Spooner | 10.0 | 9.1 | 6.0 | 8.9 | 8.9 | 6.2 | 5.5 | 10.0 | 8.9 | 6.0 |

FIG. 2

| 302 | 304 |
|---|---|
| There are times when the supervisor may need to speak with the customer | Yes |
| Resolving problems starts and stops with me | Yes |
| I think that it is important to chat with my customers for a few minutes before getting down to business | No |
| When calling my supervisor for help, I don't need to let the customer know what's going on | Yes |
| Some customers have better knowledge of a solution to a problem than I do | No |
| Serving the customers quickly is the most important thing to do | Yes |
| When a customer begins to complain about things you know are wrong about your company, it is time to stop agreeing with the customer and defend your company | No |

| Skills and Attributes |
|---|
| 1. Broad business exposure in projects |
| 2. Loan/lease portfolio experience |
| 3. Strong modeler |
| 4. Credit line experience |
| 5. Formal sales training |
| 6. Specialty lending experience |
| 7. Loan loss history |
| 8. General presence |

850

| Interviewer | Skill or Attribute |
|---|---|
| Hiring Manager | 1, 2, 4 |
| Head of Sales Dept. | 3, 5 |
| Head of Legal Dept. | 6, 7 |
| Head of Human Resources Dept. | 1, 2, 8 |

FIG. 8

| Interviewer | S or A | Name | Email | Interview Time | Debrief Rem. | CC Rem. |
|---|---|---|---|---|---|---|
| Hiring Manager | 1, 2, 4 | Jon White | white@hp.com | Feb. 3. 2007 3:00 pm EST | 24 hrs | Tania |
| Head of Sales Dept. | 3, 5 | Ed Smith | smith@hp.com | Feb. 3. 2007 4:00 pm EST | 24 hrs | Tania |
| Head of Legal Dept. | 6, 7 | Jen Stoll | stoll@hp.com | Feb. 3. 2007 5:00 pm EST | 24 hrs | Tania |
| Head of Human Res. Dept. | 1, 2, 8 | Tania Alton | alton@hp.com | Feb. 3. 2007 6:00 pm EST | 24 hrs | Tania |

| Candidate Name | Most Relevant Experience | Final Score | Job Match Hiring Score Card | Skill & Attribute Score | Interview Score | Hiring Manager | Head Of Sales Sept. | Head of Legal Dept. | Head of HR Dept. |
|---|---|---|---|---|---|---|---|---|---|
| Karen Gonzalez | GE | 9.1 | 8.8 | 9.4 | 9.1 | | | | |
| Frank Herrera | Smith Barney | 8.3 | 8.0 | 8.6 | 8.3 | | | | |
| Joe Gosz | ADM | 7.7 | 7.3 | 8.0 | 7.7 | | | | |

1100
1102 1104 1106 1108 1110 1112 1114 1116 1118 1120

MANAGEMENT OF JOB CANDIDATE INTERVIEW PROCESS USING ONLINE FACILITY

CROSS-REFERENCE TO RELATED APPLICATIONS

The subject matter of the present patent application is related to the subject matter of U.S. patent application Ser. No. 11/524,813, filed Sep. 21, 2006, and entitled "Identification of Job Candidates Based on Statistical Process." U.S. patent application Ser. No. 11/524,813 is hereby incorporated by reference in its entirety.

FIELD OF THE INVENTION

The invention disclosed broadly relates to the field of staffing, and more particularly relates to the field of hiring processes using statistical methods.

BACKGROUND OF THE INVENTION

Staffing companies match millions of people to millions of jobs. Currently, almost three million people per day are employed by staffing companies. A wide variety of methods are used to match job candidates to open positions. The process of staffing jobs, however, is not without its drawbacks. The odds of a successful hire are often no greater than 50 percent in today's workplace. Because highly qualified job candidates are not answering conventional ads, hiring managers are not trained interviewers, and the demand for talented professionals is high, the process becomes ever more difficult, time-consuming and expensive.

A commonly-used approach to matching job candidates to open positions involves the identification of a candidate's skills so as to match that candidate with an open position requiring those skills. Although this is a good way to find people who have the general qualifications for a particular job, there are a myriad of other characteristics and factors that are not considered when using this method. Another common approach to matching job candidates to open positions involves the use of directed questions to evaluate the job candidate. The results of the evaluation are used to compare the candidate to the open position and identify a match, if any. Again, although this approach may succeed in identifying certain similarities between a job candidate and a job, there are many other factors that should be taken into consideration when hiring the right person for an open position.

Furthermore, the conventional interview process consists of setting up and carrying out various interviews between selected interviewers and the job candidates. Subsequently, interviewers are asked for feedback on the job candidates. The conventional interview process, however, has its drawbacks. Problems with the convention interview process include a lack of preparation by the interviewers, which can result in anxiety or concern in the job candidate being interviewed, as well as a misuse of time since the interview is not productive. Additionally, the feedback provided by interviewers during the conventional interview process often revolves around the interviewer's personal comfort or personal style, not the attributes and skills that are most pertinent to the job. This results in hiring that is not based on facts and the needs of the company, but rather subjective preferences and conjecture. Moreover, the conventional interview process often involves a group meeting of interviewers wherein the job candidates are discussed. Meetings of this type are often dominated by the opinions of the highest ranking participant, instead of a true exchange of the most pertinent feedback on the job candidates.

Therefore, a need exists to overcome the problems with the prior art as discussed above, and particularly for a more efficient way of managing the process of interviewing candidates for a job.

SUMMARY OF THE INVENTION

Briefly, according to an embodiment of the present invention, a method for managing an interview process of at least one candidate for a job is disclosed. The method includes selecting a list of attributes pertinent to the job and selecting a list of interviewers of the at least one candidate. The method further includes assigning at least one attribute from the list of attributes to each interviewer and generating an interview template for each interviewer based on the at least one attribute assigned to each interviewer, wherein an interview template comprises a list of topics to discuss with the at least one candidate. The method further includes scheduling an interview between each interviewer and each candidate and allowing each interviewer to submit, via a Web page, feedback describing each candidate's competency in each of the attributes assigned to the interviewer based on the interview between each interviewer and each candidate. The method further includes automatically calculating, for each candidate, a first value based on the feedback received from each interviewer.

In another embodiment of the present invention, a computer program product including computer instructions for managing an interview process of at least one candidate for a job is disclosed. The computer instructions include instructions for selecting a list of attributes pertinent to the job and selecting a list of interviewers of the at least one candidate. The computer instructions further include instructions for assigning at least one attribute from the list of attributes to each interviewer and generating an interview template for each interviewer based on the at least one attribute assigned to each interviewer, wherein an interview template comprises a list of topics to discuss with the at least one candidate. The computer instructions further include instructions for scheduling an interview between each interviewer and each candidate and allowing each interviewer to submit, via a Web page, feedback describing each candidate's competency in each of the attributes assigned to the interviewer based on the interview between each interviewer and each candidate. The computer instructions further include instructions for automatically calculating, for each candidate, a first value based on the feedback received from each interviewer.

In another embodiment of the present invention, a network-enabled server for managing an interview process of at least one candidate for a job is disclosed. The network-enabled server includes a processor configured for providing a user with a Web page for selecting a list of attributes pertinent to the job and selecting a list of interviewers of the at least one candidate. A Web page is further provided for assigning at least one attribute from the list of attributes to each interviewer and generating an interview template for each interviewer based on the at least one attribute assigned to each interviewer, wherein an interview template comprises a list of topics to discuss with the at least one candidate. A Web page is further provided for scheduling an interview between each interviewer and each candidate and allowing each interviewer to submit, via a Web page, feedback describing each candidate's competency in each of the attributes assigned to the interviewer based on the interview between each interviewer and each candidate. The processor is further configured for automatically calculating, for each candidate, a first value based on the feedback received from each interviewer.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 2 is an illustration of a job attribute matrix used in a candidate selection process, according to one embodiment of the present invention.

FIG. 3 is an illustration of a candidate response list used in a candidate selection process, according to one embodiment of the present invention.

FIG. 8 is an illustration of set of matrices used during the interview management process, according to one embodiment of the present invention.

FIG. 10 is an illustration of an interview scheduling form used during the interview management process, according to one embodiment of the present invention.

FIG. 11 is an illustration of a data review screen used during the interview management process, according to one embodiment of the present invention.

DETAILED DESCRIPTION

Figure 1:
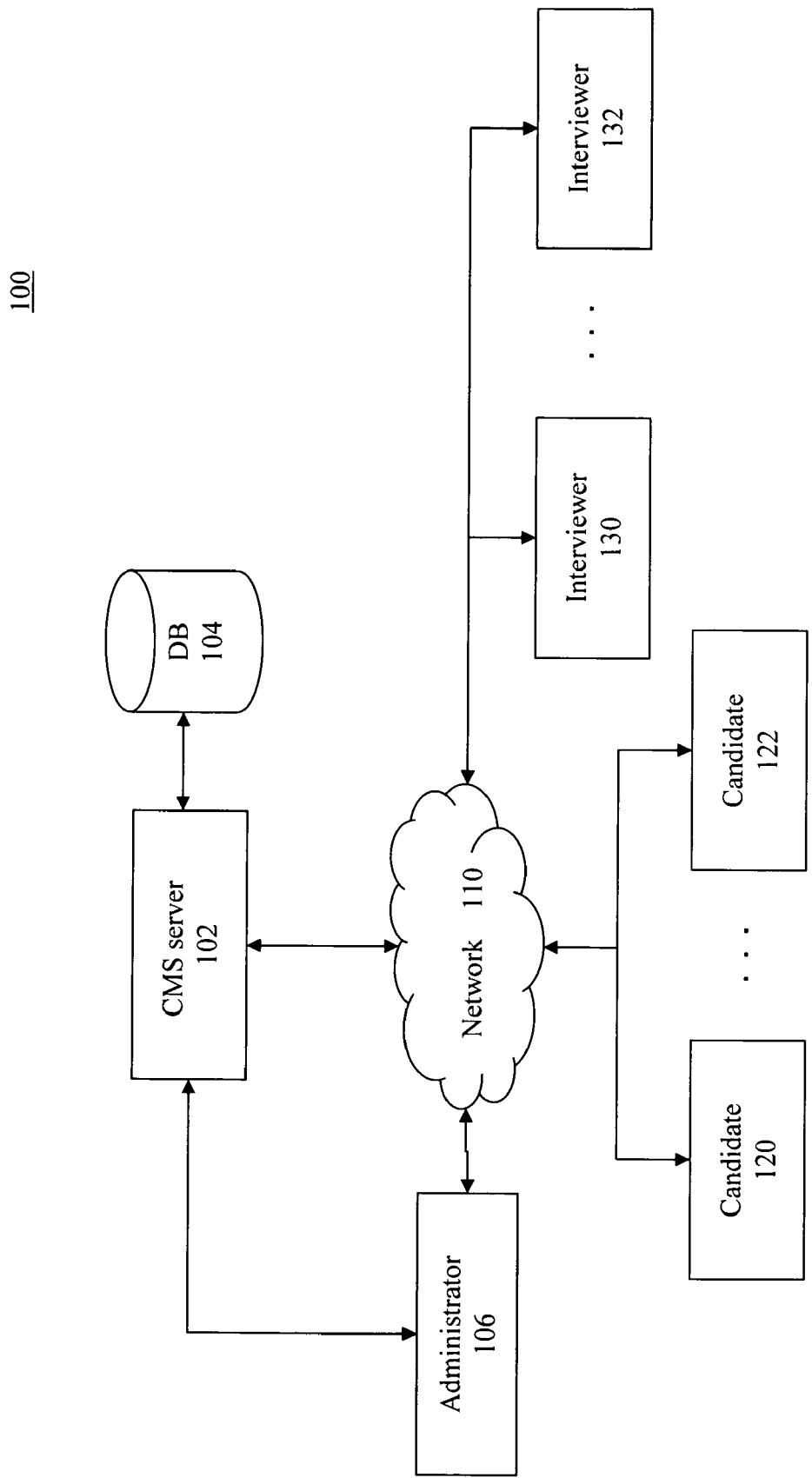
FIG. 1 is a block diagram showing a high level system architecture 100 of a system for executing a candidate selection process and/or an interview management process, according to one embodiment of the present invention.

It should be understood that the embodiments below are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

The present invention overcomes problems with the prior art by providing an improved system, method and computer program product for selecting candidates for a particular job using statistical processes. The present invention greatly increases the odds of selecting and hiring the best candidates for a particular job. The present invention further provides a unique assessment process that identifies the best qualities of a business' employees and then using these qualities to search for candidates from a pool. One advantage of the present invention is an increase in the odds of making the best hire for a new position. Another advantage of the present invention is a reduction in hiring costs and a reduction in expensive turnover in existing job positions (i.e., higher retention rates). Yet another advantage of the present invention is a reduction in company time spent on the hiring process.

The present invention, according to a preferred embodiment, further overcomes problems with the prior art by providing an improved system, method and computer program product for managing the process of interviewing candidates for a particular job using an online facility. The present invention greatly increases the productivity of candidate interviews by implementing skill and attribute driven interviews that extract the most pertinent information from the job candidates. The present invention further includes an online cumulative feedback facility that allows for the simple and expedited collection of feedback from interviewers, thereby expediting the interview process and maintaining an organized collection of interview feedback information. The online feedback facility further allows for the automated collection of unbiased feedback information from an interviewer without input or influence from other interviewers, thereby producing more pertinent feedback information.

FIG. 1 is a block diagram showing a high level system architecture of system 100 for executing a candidate selection process and/or an interview management process, according to one embodiment of the present invention. FIG. 1 illustrates the client-server architecture of one embodiment of the present invention. The exemplary embodiments of the present invention adhere to the system architecture of FIG. 1. FIG. 1 shows a candidate management system (CMS) server 102 connected to the network 110. The CMS server 102 (which is described in more detail below) substantially performs the candidate selection processes and/or the interview management processes of the present invention.

FIG. 1 further shows an embodiment of the present invention wherein clients comprising job candidates interact with the CMS server 102 over a network 110, such as in an enterprise implementation of the management system 100 that services multiple job candidates in more than one location. FIG. 1 shows client computers 120 through 122 connected to a network 110. Client computers 120-122 comprise job candidates running a client application on the client computer so as to participate in the candidate selection process. It should be noted that although FIG. 1 shows only two client computers 120 and 122, the system of the present invention supports any number of client computers.

FIG. 1 further shows an embodiment of the present invention wherein additional clients comprising interviewers interact with the CMS server 102 over a network 110, such as in an enterprise implementation of the management system 100. FIG. 1 shows client computers 130 through 132 connected to a network 110. Client computers 130-132 comprise interviewers running a client application, such as a Web browser, on the client computer so as to participate in the interview management process. It should be noted that although FIG. 1 shows only two client computers 130 and 132, the system of the present invention supports any number of client computers. It should also be noted that although FIG. 1 shows the client computers 130-132 connected to the CMS server 102 via the network 110, the present invention also supports a direct connection between the client computers 130-132 and the CMS server 102.

Finally, an administrator client 106 is shown to be connected either to the network 110 or directly to the CMS server 102. The administrator client 106 is used to administer the CMS server 102 and therefore the administrator client can be remotely located via the network 110 or situated within the same intranet as the CMS server 102.

In an embodiment of the present invention, the computer systems of client computers 120-122, 130-132, administrator client 106 and CMS server 102 are one or more Personal Computers (PCs), Personal Digital Assistants (PDAs), hand held computers, palm top computers, lap top computers, smart phones, game consoles or any other information processing devices. A PC can be one or more IBM or compatible PC workstations running a Microsoft Windows or LINUX operating system, one or more Macintosh computers running a Mac OS operating system, or an equivalent. In another embodiment, the client computers 120-122, 130-132, administrator client 106 and CMS server 102 are a server system, such as SUN Ultra workstations running a SunOS operating system or IBM RS/6000 workstations and servers running the AIX operating system. The computer systems of client computers 120-122, 130-132, administrator client 106 and CMS server 102 are described in greater detail below with reference to FIG. 6.

In an embodiment of the present invention, the network 110 is a circuit switched network, such as the Public Service Telephone Network (PSTN). In another embodiment, the network 130 is a packet switched network. The packet switched network is a wide area network (WAN), such as the global Internet, a private WAN, a local area network (LAN), a telecommunications network or any combination of the above-mentioned networks. In yet another embodiment, the structure of the network 110 is a wired network, a wireless network, a broadcast network or a point-to-point network.

Optionally, the CMS server 102 includes a Web server that connects to the network 110 via a network interface. The CMS server 102 is logically connected to the Web server, which provides a Web interface available to clients (such as clients 120-122, 130-132). This option is advantageous as a Web interface allows any clients having a Web connection to connect to the CMS server 102. A Web interface provides a simple, efficient, highly compatible, economical and highly available connection to the CMS server 102 to a wide range of clients.

Also shown in FIG. 1 is a database 104 coupled with the CMS server 102. The database 104 is a repository for data and includes all information necessary for performing the functions of the system 100. Database 104 can be any commercially database, such as an Oracle Database, Enterprise or Personal Edition, available from Oracle Corporation, or a Microsoft SQL Server or Access 2000 database available from Microsoft Corporation. Database 104 may further be managed by a database management system, which is an application that controls the organization, storage and retrieval of data (fields, records and files) in the databases. A database management system accepts requests for data from an application program and instructs the operating system to transfer the appropriate data. A database management system may also control the security and integrity of a database. Data security prevents unauthorized users from viewing or updating certain portions of the database. A database management system can be any commercially database management system, such as the Oracle E-Business Suite available from Oracle Corporation.

Each client 120-122, 130-132 runs a client application, such as an application programmed in C++, Visual Basic, a Java applet, a Java scriptlet, Java script, Perl script, an Active X control or any self-sufficient application executing on a client computer. It should also be noted that in the embodiment of the present invention described above, the clients 120-122, 130-132 and administrator 106 are depicted as separate from CMS server 102. In an alternative embodiment of the present invention, any one or all of the clients 120-122, 130-132 and administrator 106 can be integrated, along with CMS server 102. In this alternative embodiment, those entities that are integrated share the same resources.

FIG. 2 is an illustration of a job attribute matrix 200 used in a candidate selection process, according to one embodiment of the present invention. FIG. 2 shows a matrix 200 containing attribute values for a list of attributes for each of a plurality of candidates. Matrix 200 shows a list of attributes and skills located along the top row 202. Although, any number of attributes and skills may be located along the top row 202, the current matrix 200 shows ten attributes and skill. Matrix 200 further shows a list of job candidate names along the left-most column 204. The body 206 of the matrix 200 includes the attributes values calculated for each candidate. That is, the body 206 of the matrix 200 shows, for each candidate, the value calculated for each attribute and skill located along the top row 202.

In an embodiment of the present invention, the data required to create the attribute values of matrix 200 above are garnered through questionnaires that are provided to each candidate. The questionnaires include questions from which the candidates' skills and attributes can be gleamed from the responses. In one alternative, the questionnaires are provided in paper format to each candidate, who proceeds to fill out the form and return it to an administrator who enters the relevant data into the database 104. In another alternative, the questionnaires are provided in Web form to each candidate via a Web page to the client computer 120-122. The candidates proceed to fill out the forms online and subsequently the relevant data is automatically entered into the database 104.

In another embodiment of the present invention, the attribute values calculated for the body 206 of the matrix 200 can be calculated in a variety of ways. In one alternative, at attribute value ranges from 1-10 and the value is calculated based on the data garnered from the candidate. For example, for the attribute "10 years of commercial experience," the candidate is given an attribute value of 10 if he possesses 10 years or more of commercial experience. If the candidate possesses less than 10 years of commercial experience, he is given an attribute value equal to the number of years of experience he possesses. In another example, for the attribute "Stress tolerance," the candidate is given an attribute value of 10 if, based on his questionnaire responses, he possesses the greatest amount of stress tolerance. For lowers amounts of stress tolerance, the candidate is given a lower attribute value up to a zero attribute value for possessing no stress tolerance qualities. Attribute values can be calculated based on the candidate's responses to questions in the questionnaires, the candidate's reactions to certain test scenarios, the candidate's personality test results, third party assessments of the candidate or any combination of the former The matrix 200 shown in FIG. 2 shows attribute values for a list of attributes and skills. In another embodiment of the present invention, the matrix 200 can include attribute values for behavioral characteristics, wherein the attribute values can be calculated based on the candidate's responses to questions in the questionnaires, the candidate's reactions to certain test scenarios, the candidate's personality test results, third party assessments of the candidate or any combination of the former.

FIG. 3 is an illustration of a candidate response list 300 used in a candidate selection process, according to one embodiment of the present invention. FIG. 3 shows a list 300 containing one candidate's responses to a list of questions pertinent to the job for which the candidate is applying. List 300 shows a list of questions located along the left-most column 302. Although, any number of questions may be located along the left-most column 302, the current list 300 shows seven questions. List 300 further shows the candidate's response to each question along the right-most column 304.

In an embodiment of the present invention, the responses from list 300 above are garnered through questionnaires that are provided to each candidate. The questionnaires include questions from which the candidates' skills and attributes can be gleamed from the responses. In one alternative, the questionnaires are provided in paper format to each candidate, who proceeds to fill out the form and return it to an administrator who enters the relevant data into the database 104. In another alternative, the questionnaires are provided in Web form to each candidate via a Web page to the client computer 120-122. The candidates proceed to fill out the forms online and subsequently the relevant data is automatically entered into the database 104.

In an embodiment of the present invention, a corresponding list of ideal responses to the set of questions of list 300 can be generated. That is, whereas list 300 shows a list of a candidate's responses to a set of questions, an administrator can generate a list of ideal responses to the same set of questions, wherein the ideal responses are generated by ideal candidates. The system 100 may include in the database 104 a collection of responses from ideal candidates who perform various different functional positions (VP Sales, VP Marketing, CFO, CFO Venture Backed Firm, for example) for which a candidate is being sought. Alternatively, the database 104 may include a collection of responses from ideal candidates consisting of individuals at the client company who are currently employed in the job for which the candidates are being evaluated.

The logic behind using a list of ideal responses revolves around the belief that an ideal candidate will produce ideal responses to the set of questions, which ideal responses should be emulated by job candidates. Finding job candidates with responses similar or identical to the ideal list of responses increases the chances of hiring a candidate that will equally excel at the job position.

Figure 4:
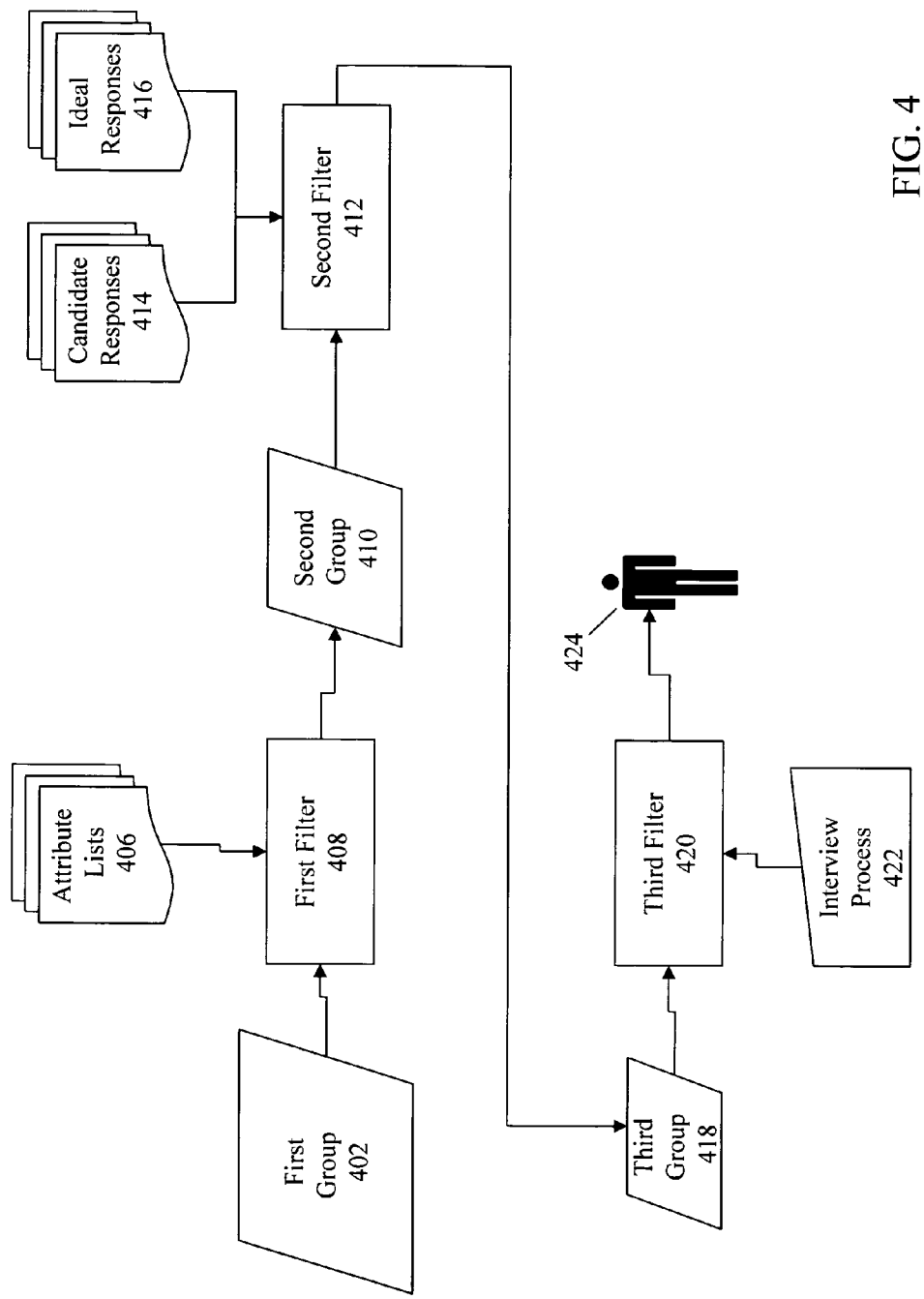
FIG. 4 is a block diagram showing the components and data used during the candidate selection process, according to one embodiment of the present invention.
Figure 5:
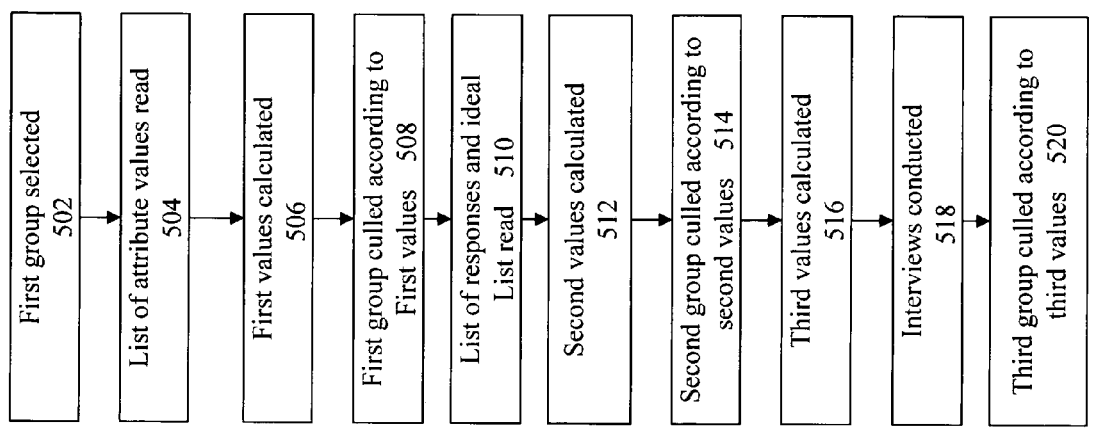
FIG. 5 is a flowchart showing the control flow of the candidate selection process, according to one embodiment of the present invention.

FIG. 4 is a block diagram showing the components and data used during the candidate selection process, according to one embodiment of the present invention. FIG. 5 shows a group of job candidates 402 selected as the initial pool from which the candidate selection will occur. The first filter 408 is executed by reading a list of attribute values 406 for each candidate in the group 402. The first group 402 is culled by the first filter 408, thereby generating second group 410 of candidates, which is smaller than first group 402.

The second filter 412 is executed by reading a list 416 of ideal responses to a set of questions and, for each candidate in the group 410, a list 414 of responses to the same set of questions. Alternatively, the second filter 412 may include a variety of assessment and test products, based on ideal candidates from database 104, which are evaluated against the second group 410. In general, the behavior and intellectual traits that are present in the ideal candidates from database 104 are used to generate the second filter 412.

The second group 410 is culled by the second filter 412, thereby generating third group 418 of candidates, which is smaller than second group 410. The second group 410 is further culled by filter 420, thereby generating a final group 424 of one or more candidates, which is smaller than third group 418. Optionally, the third filter 420 can further effectuated by conducting a live interview of the remaining candidates in group 418, as described in greater detail below. Alternatively, the third filter 420 can further be effectuated by having the remaining candidates in group 418 complete questionnaires that reveal further information about their behavior and characteristics. Based on the results of the interview, and/or the questionnaires, candidates can be eliminated from consideration or given scores on their interview performance.

FIG. 5 is a flowchart showing the control flow of the candidate selection process, according to one embodiment of the present invention. FIG. 5 begins with step 502, wherein a group of job candidates 402 are selected as the initial pool from which the candidate selection will occur. In step 504, the first filter 408 is executed by reading a list of attribute values 406 for each candidate in the group 402. That is, for each candidate in the group 402, the CMS server 102 reads an attribute value list 406, similar or identical to matrix 200. In step 506, the CMS server 102 calculates a first value for each candidate in group 402, wherein the first value for each candidate is based on the attribute values corresponding to that candidate.

In an embodiment of the present invention, the first value calculated for each candidate as a simple sum or average. For example, referring to the attribute values corresponding to candidate John Smith in matrix 200, the first value can be a sum of the attribute values for John Smith or the first value may be an average of the attribute values. In another embodiment of the present invention, a first value can be calculated for a candidate by taking a weighted average of the attribute values for that candidate, wherein weights are associated with certain attribute values. For example, it may be the case that of all the attributes in matrix 200, the attributes "Stress tolerance" and "Detail orientation" are more important than the others. In this case, a first value for candidate John Smith can be calculated by taking an average of the attribute values for John Smith, with extra weight being given to attribute values for attributes "Stress tolerance" and "Detail orientation."

In step 508, the first group 402 is culled by eliminating those candidates with a first value below a predetermined threshold value, thereby generating second group 410 of candidates, which is smaller than first group 402.

In step 510, the second filter 412 is executed by reading a list 416 of ideal responses to a set of questions and, for each candidate in the group 410, a list 414 of responses to the same set of questions. That is, for each candidate in the group 410, the CMS server 102 reads a list 414 of responses, similar or identical to list 300. In step 512, the CMS server 102 calculates a second value for each candidate in group 410, wherein the second value for each candidate is based on a comparison of the list 414 of responses with list 416 of ideal responses. Alternatively, the second filter 412 may include a variety of assessment and test products, based on ideal candidates from database 104, which are evaluated against the second group 410.

In one embodiment of the present invention, the second value can be calculated by simply calculating the number or percentage of candidate responses that coincide with the ideal responses. In one alternative, a candidate's second value is increased a certain amount for each response that coincides with an ideal response. In another embodiment of the present invention, a second value can be calculated for a candidate by taking a weighted average of the percentage of the candidate's responses that coincide with the ideal responses, wherein weights are associated with certain responses. For example, it may be the case that of all the responses in list 414, the first two responses are more important than the others. In this case, a second value for a candidate can be calculated by taking an average of the percentage of the candidate's responses that coincide with the ideal responses, with extra weight being given to the first two responses.

In step 514, the second group 410 is culled by eliminating those candidates with a second value below a predetermined threshold value, thereby generating third group 418 of candidates, which is smaller than second group 410.

In step 516, the third filter 420 is executed by calculating a third value for each candidate in group 418, wherein the third value for each candidate is based on a combination of the first and second value. In one embodiment of the present invention, the third value can be calculated by simply summing or averaging the first and second values. In another alternative, the third value can be calculated by using a formula involving the first and second values, such as: two thirds of the first value plus one third of the second value. In another alternative, a weighted average can be taken of the first and second values, wherein the first value is given a weight of two thirds and the second value is given a weight of one third.

In optional step 518, the third filter 420 can further effectuated by conducting a live interview of the remaining candidates in group 418, as described in greater detail below. Based on the results of the interview, candidates can be eliminated from consideration or given scores on their interview performance. This process is described in greater detail below with reference to FIGS. 7-11. In another alternative, the third filter 420 can further be effectuated by having the remaining candidates in group 418 complete questionnaires that reveal further information about their behavior and characteristics.

In step 520, the third group 418 is culled by eliminating those candidates with a third value below a predetermined threshold value, thereby generating a final group 424 of one or more candidates, which is smaller than third group 418.

Figure 6:
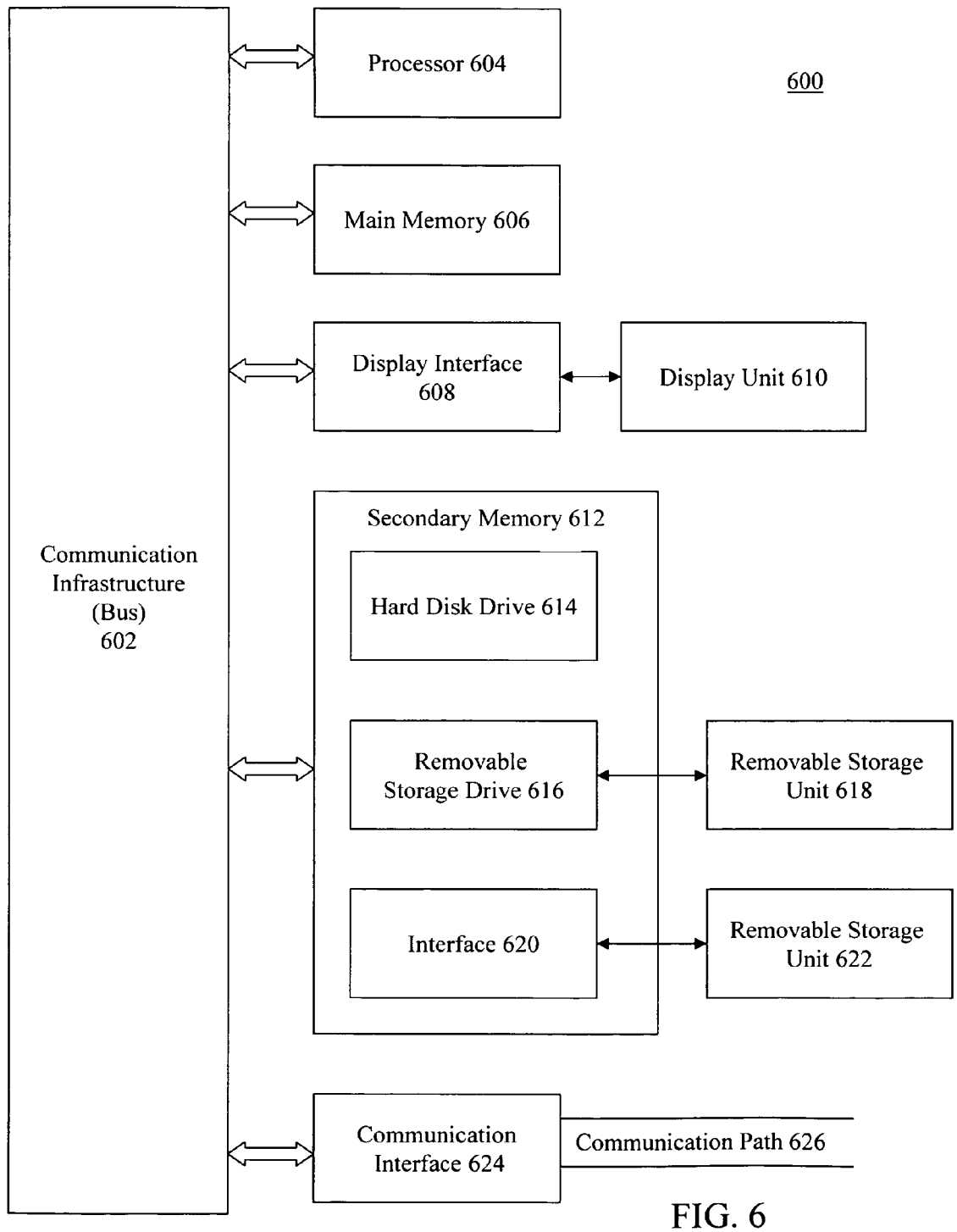
FIG. 6 is a block diagram showing an embodiment of a computer system useful for implementing an embodiment of the present invention.

FIG. 6 is a block diagram showing an embodiment of a computer system 600 useful for implementing an embodiment of the present invention. The present invention can be realized in hardware, software, or a combination of hardware and software in the system described in FIG. 6. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, which allows a computer system to read such computer readable information.

FIG. 6 is a block diagram of a computer system useful for implementing an embodiment of the present invention. The computer system 600 of FIG. 6 is a more detailed representation of computers 120-122, 130-132, administrator 106 or server 102. The computer system 600 of FIG. 6 includes one or more processors, such as processor 604. The processor 604 is connected to a communication infrastructure 602 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system 600 can include a display interface 608 that forwards graphics, text, and other data from the communication infrastructure 602 (or from a frame buffer not shown) for display on the display unit 610. The computer system 600 also includes a main memory 606, preferably random access memory (RAM), and may also include a secondary memory 612. The secondary memory 612 may include, for example, a hard disk drive 614 and/or a removable storage drive 616, representing a floppy disk drive, a magnetic tape drive, an optical disk drive, etc. The removable storage drive 616 reads from and/or writes to a removable storage unit 618 in a manner well known to those having ordinary skill in the art. Removable storage unit 618, represents, for example, a floppy disk, magnetic tape, optical disk, etc. which is read by and written to by removable storage drive 616. As will be appreciated, the removable storage unit 618 includes a computer usable storage medium having stored therein computer software and/or data.

In alternative embodiments, the secondary memory 612 may include other similar means for allowing computer programs or other instructions to be loaded into the computer system. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to the computer system.

The computer system may also include a communications interface 624. Communications interface 624 allows software and data to be transferred between the computer system and external devices. Examples of communications interface 624 may include a modem, a network interface (such as an Ethernet card), a communications port, a PCMCIA slot and card, etc. Software and data transferred via communications interface 624 are in the form of signals which may be, for example, electronic, electromagnetic, optical, or other signals capable of being received by communications interface 624. These signals are provided to communications interface 624 via a communications path (i.e., channel) 626. This channel 626 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 606 and secondary memory 612, removable storage drive 616, a hard disk installed in hard disk drive 614, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, which allow a computer to read such computer readable information.

Computer programs (also called computer control logic) are stored in main memory 606 and/or secondary memory 612. Computer programs may also be received via communications interface 624. Such computer programs, when executed, enable the computer system to perform the features of the present invention as discussed herein. In particular, the computer programs, when executed, enable the processor 604 to perform the features of the computer system. Accordingly, such computer programs represent controllers of the computer system.

What has been shown and discussed is a highly-simplified depiction of a programmable computer apparatus. Those skilled in the art will appreciate that other low-level components and connections are required in any practical application of a computer apparatus.

Figure 7:
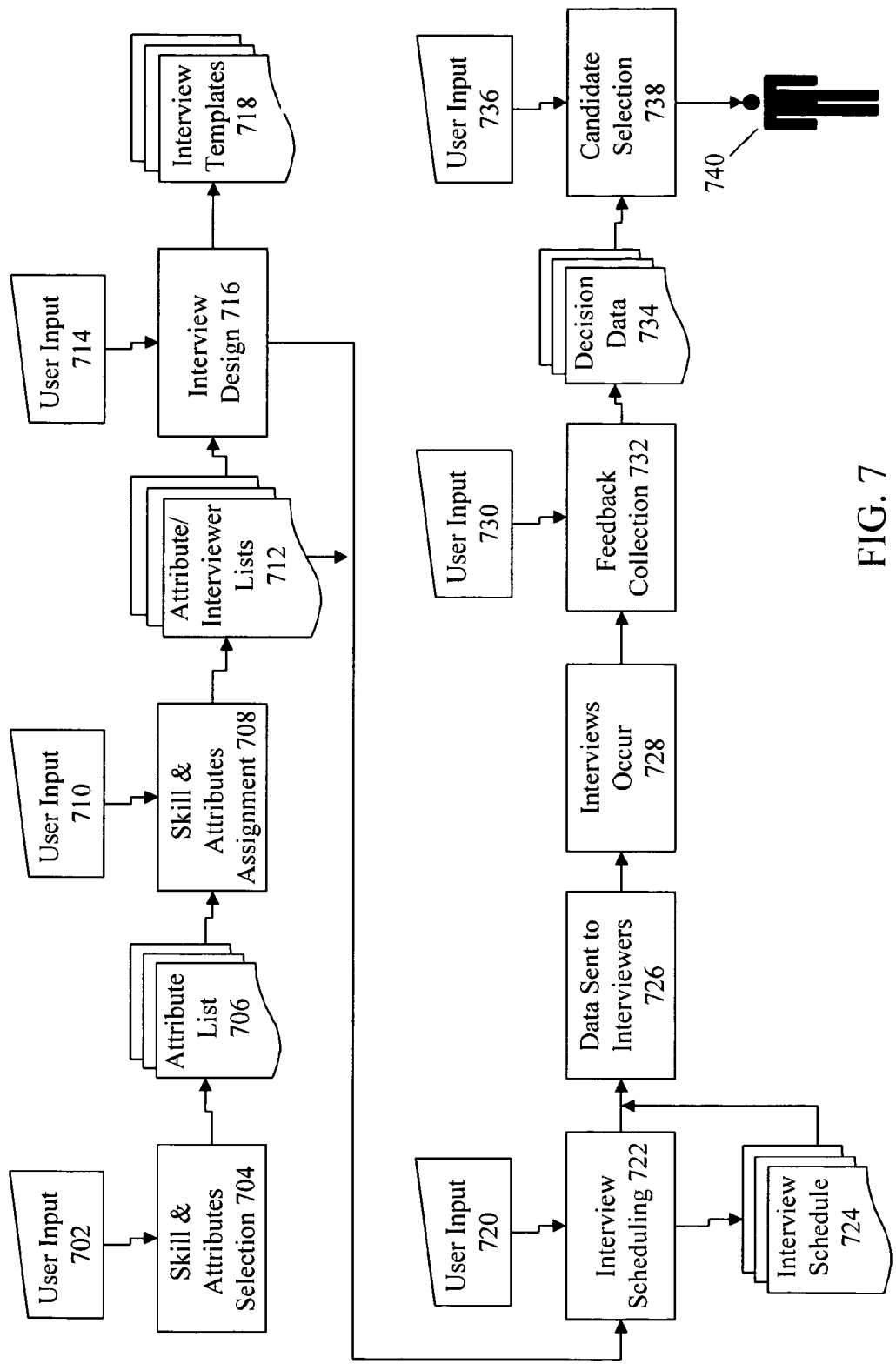
FIG. 7 is a block diagram showing the components and data used during the interview management process, according to one embodiment of the present invention.

FIG. 7 is a block diagram showing the components and data used during the interview management process, according to one embodiment of the present invention. FIG. 7 shows a skill and attribute selection process 704 accompanied by user input 702. Process 704 comprises the selection of a set of skills and attributes (hereinafter referred to collectively as attributes), such as attributes shown in FIG. 2, wherein the attributes are pertinent to the job for which candidates are being interviewed. In an embodiment of the present invention, the attribute selection process 704 involves a user, such as administrator 106, logging onto a Web site or other online facility and selecting attributes on a Web page from a list and attributes. The output of process 704 is an attribute list 706.

FIG. 7 further shows an attribute assignment process 708 accompanied by user input 710. Process 708 comprises the assignment of the attributes of list 706 to a set of interviewers, such that each interviewer is assigned at least one attribute against which to interview. In an embodiment of the present invention, the attribute assignment process 708 involves a user, such as administrator 106, logging onto a Web site or other online facility, selecting interviewers on a Web page from a list of interviewers and then assigning attributes to each interviewer from the list 706. The output of process 708 is an attribute/interviewer list 712 wherein each attribute is matched with an interviewer.

FIG. 7 further shows an interview design process 716 accompanied by user input 714. Process 716 comprises the design of an interview template 718 for each interviewer for each interview, wherein the interview template comprises a list of topics to discuss during the interview and wherein the topics correspond to the attributes matched with each interviewer in attribute/interviewer list 712. The interview template 718 is described in greater detail below with reference to FIG. 9. In an embodiment of the present invention, the interview design process 716 involves a user, such as administrator 106, logging onto a Web site or other online facility and selecting topics and questions for inclusion in each interview template 718. The output of process 716 are interview templates 718.

FIG. 7 further shows an interview scheduling process 722 accompanied by user input 722. Process 722 comprises the scheduling of each interview between a job candidate and an interviewer, producing an interview schedule 724. The interview schedule 724 is described in greater detail below with reference to FIG. 10. In an embodiment of the present invention, the interview scheduling process 722 involves a user, such as administrator 106, logging onto a Web site or other online facility and scheduling each interview between a job candidate and an interviewer. The output of process 722 are interview schedule 724.

In step 726, the interview templates 718 and the interview schedules 724 are sent to each interviewer. In an embodiment of the present invention, the process 726 occurs automatically, enabled by an online facility that, for example, sends an email to each interviewer, wherein the email includes interview templates 718 and interview schedules 724. In step 728, the interviews scheduled in interview schedules 724 and outlined in interview templates 718 occur.

In an embodiment of the present invention, the data sent to each interviewer in step 726 may be customized according to the interviewer. In this embodiment, the interviewer or an administrator may specify that the interviewer shall only receive certain items. For example, the interviewer may specify that he shall only receive one interview template, the time of the interview and a resume for the job candidate.

FIG. 7 further shows a feedback collection process 732 accompanied by user input 730. Process 732 comprises the collection of feedback from each interviewer, wherein the feedback includes the results of each interview between each interviewer and job candidate. The format for the collection of interview feedback data is described with reference to interview template 718 and FIG. 9 below. In an embodiment of the present invention, the feedback collection process 732 involves one or more interviewers logging onto a Web site or other online facility and entering interview feedback data, as described in connection with interview template 718. The output of process 732 is decision data 734, which comprises the interview feedback data, as well as the first, second and third values of FIG. 5 above.

FIG. 7 further shows a candidate selection process 738 accompanied by user input 736. Process 738 comprises the selection of a job candidate based on the decision data 734. The format of the decision data 734 is described with reference to FIG. 11 below. In an embodiment of the present invention, the candidate selection process 738 involves a user, such as administrator 106, logging onto a Web site or other online facility, viewing decision data 734 and selecting a job candidate. The output of process 738 is the selection of one or more job candidates 740.

FIG. 8 is an illustration of set of matrices used during the interview management process, according to one embodiment of the present invention. The matrices of FIG. 8 are used during the skill and attribute selection process 704 accompanied by user input 702. Process 704 comprises the selection of a set of attributes 802 wherein the attributes are pertinent to the job for which candidates are being interviewed. List 800 comprises a list of attributes selected by a user as being considered pertinent to the job for which candidates are being interviewed. In an embodiment of the present invention, the selection of attributes 802 involves a user, such as administrator 106, logging onto a Web site or other online facility, and selecting the attributes 802 from a list of available attributes using a graphical user interface.

List 850 comprises a list of interviewers 804 and corresponding attributes 806 wherein each interviewer is assigned one or more attributes against which to interview. In an embodiment of the present invention, the assigned of attributes 806 to interviewers 804 involves a user, such as administrator 106, logging onto a Web site or other online facility, and assigning the attributes from list 800 to interviewers using a graphical user interface.

Figure 9:
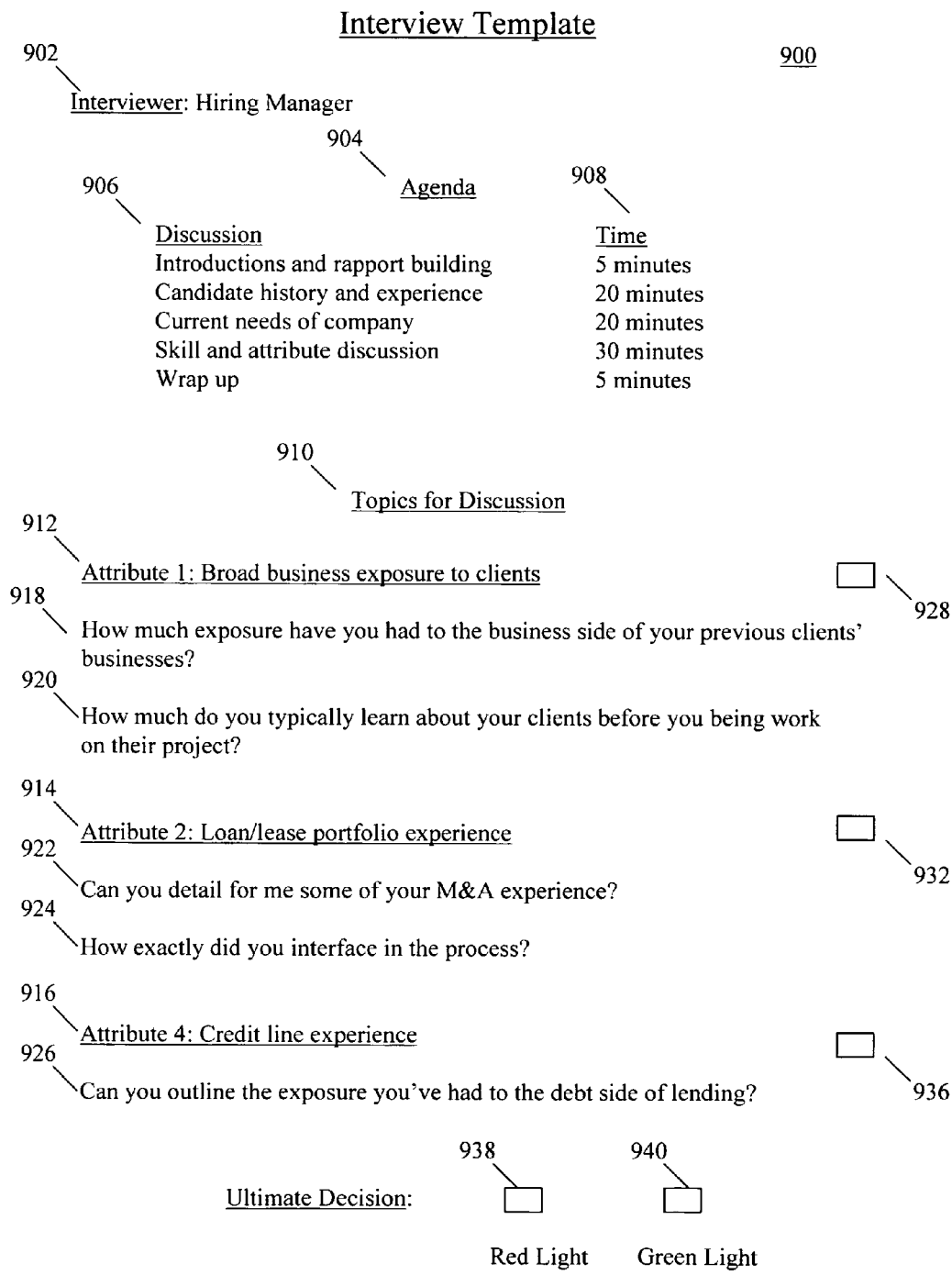
FIG. 9 is an illustration of an interview template and feedback form used during the interview management process, according to one embodiment of the present invention.

FIG. 9 is an illustration of an interview template 900 and feedback form used during the interview management process, according to one embodiment of the present invention. FIG. 9 shows an interview template 900 wherein the interview template 900 comprises a list of topics to discuss during the interview and wherein the topics correspond to the attributes matched with each interviewer in attribute/interviewer list 712 (also see FIG. 8). Interview template 900 corresponds to interviewer 902 and comprises an agenda 904 comprising a list of themes 906 and an amount of time 908 to spend on each theme. Section 910 of the interview template 900 includes a list of topics for discussion with the candidate, wherein each topic corresponds to an attribute 806 assigned to the interviewer 804 in list 850 of FIG. 8.

FIG. 9 shows that attribute 912 (corresponding to the interviewer as per list 850) includes two questions 918, 920 that explore the attribute 912 within an oral discussion with the job candidate. Further shown is attribute 914 including questions 922, 924 and attribute 916 includes question 926. Also shown next to each attribute is a square for entering feedback by the interviewer. Square 928 is shown next to attribute 912, square 932 is shown next to attribute 914 and square 936 is shown next to attribute 916.

In an embodiment of the present invention, the feedback data that may be entered into squares 928, 932, 936 is any one of four superlative descriptions, (for example, superior, above average, average and weak) wherein each description describes the strength of the job candidate with regard to that particular attribute. In another embodiment of the present invention, the feedback data that may be entered into squares 928, 932, 936 is a number between one a ten that describes the strength of the job candidate with regard to that particular attribute.

In another embodiment of the present invention, the feedback data that may be entered into squares 938-940 is any one of two pass or no-pass values, (for example, red light or green light) wherein each value defines whether the interviewer decides the job candidate should or should not be hired. In yet another embodiment of the present invention, the feedback data that may be entered into squares 938-940 is any one of three or more values, (for example, red light, yellow light or green light) wherein each value defines whether the interviewer decides the job candidate should or should not be hired.

In another embodiment of the present invention, interview design process 716 of FIG. 7 may involve a user, such as administrator 106, logging onto a Web site or other online facility, and entering the questions 918, 920, 922, 924, 926 using a graphical user interface. In another embodiment of the present invention, feedback collection process 732 of FIG. 7 may involve an interviewer logging onto a Web site or other online facility and entering feedback data into squares 928, 932, 936, as well as squares 938-940, using a graphical user interface. Feedback data may be entered into squares 928, 932, 936, as well as squares 938-940 using drop down menus or other graphical user interface facilities.

FIG. 10 is an illustration of an interview scheduling form 1000 used during the interview management process, according to one embodiment of the present invention. FIG. 10 shows column 1004 including the name of each interviewer. Also shown is column 1006 wherein the attribute corresponding to each interviewer (corresponding to the interviewer as per list 850) is shown. Column 1008 indicates the name of each interviewer while column 1010 indicates the email address of each interviewer. Column 1012 indicates the time and date of the scheduled interview while column 1014 indicates the amount of time given to the interviewer to respond with interview feedback before a reminder is sent to him. Column 1016 indicates to whom a copy of each debrief reminder is sent. In an embodiment of the present invention, debrief reminders are sent automatically, enabled by an online facility that, for example, sends an email to each interviewer, wherein the email reminds the interviewer to provide interview feedback.

In an embodiment of the present invention, the interview scheduling form 1000 can be used to view whether interview feedback data has been provided by each interviewer. In this embodiment, an additional column (not shown) is appended to form 100 which indicates whether interview feedback data has been provided by each interviewer.

FIG. 11 is an illustration of a data review screen 1100 used during the interview management process, according to one embodiment of the present invention. Column 1102 shows the name of each job candidate while column 1104 shows a brief indicator of the each job candidate's most relevant experience. Columns 1114, 1116, 1118 and 1120 show the pass or no-pass value given to each job candidate by each interviewer. Horizontally cross-hatched areas indicate a pass (or green-light) value while vertically cross-hatched areas indicate a no-pass (or red-light) value. It should be noted that although FIG. 11 shows a numerical-based view of the decision data 734, the present invention supports various types of views of the decision data, such as pie charts, graphs, bar graphs and the like.

Column 1110 indicates the attribute score given to each job candidate, wherein the attribute score corresponds to the first value of FIG. 5. Column 1108 indicates the job hiring match score given to each job candidate, wherein the job match hiring score corresponds to the second value of FIG. 5.

Column 1112 indicates the interview score given to each job candidate, wherein the interview score corresponds to the feedback data provided by each interviewer. In an embodiment of the present invention, the interview score automatically calculated by the CMS 102 is based on the feedback received from each interviewer, wherein the interview score is a percentage between one and one hundred based on either the superlative values of the feedback or a combination of the superlative values and the pass/no pass value of the feedback. For example, the interview score can be a percentage of interviewer feedback that indicates either a superior or an above average rating for all attributes. In another example, the interview score can be a percentage of interviewer feedback that indicates only a superior rating for all attributes. In another example, fifty percent of the interview score is based on a percentage of interviewer feedback that indicates either a superior or an above average rating for all attributes and fifty percent of the interview score is based on a percentage of interviewer feedback that indicates a pass (or green light) value. In another example, fifty percent of the interview score is based on a percentage of interviewer feedback that indicates only a superior rating for all attributes and fifty percent of the interview score is based on a percentage of interviewer feedback that indicates a pass (or green light) value.

Column 1106 indicates the final score given to each candidate wherein the final score is a combination of the attribute score, the job hiring match score and the interview score. In one embodiment of the present invention, the final score can be calculated by simply summing or averaging the three values above values. In another alternative, the final score can be calculated by using a formula involving the three values above, such as: two thirds of the first value plus one sixth of the second value and one sixth of the third value. In another alternative, a weighted average can be taken of the three values.

In another embodiment of the present invention, the data provided within data review screen 1100 can comprise some or all of the feedback data provided by the interviewers in process 732. That is, the data provided within data review screen 1100 can be viewed at any time during or after the conclusion of the feedback collection process 732. In another embodiment of the present invention, the data provided within data review screen 1100 can be customized such that the user can choose which data to view while making the decisions of the candidate selection process 738.

In one embodiment of the present invention, the CMS server 102 is further capable of producing reports on the performance of interviewers and/or interview teams. Performance metrics include reporting on timeliness of following up on interviews and the timeliness of interviewers to provide interview feedback. The reporting feature can further be used to report on hired employees, their current status with the company (i.e., still employed, terminated, quit), and their current disposition with the company (A player, B player, C player). The data above on hired employees can be correlated with the predictions of interviewers to determine which interviewers made the most accurate predictions of job candidates.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

I claim:

1. A method for selecting at least one candidate for a job, comprising:

storing skills, competencies, and experiences of a plurality of job candidates in a networked memory device, thereby forming a first group;

loading the skills, competencies, and experiences of the plurality of job candidates from the memory device into a networked processor;

matching the critical skills, competencies, and experiences between the job and each of the plurality of job candidates;

calculating a first value based on the matching of the critical skills, competencies, and experiences; wherein the first value is a weighted average;

storing the calculated first value in the memory device;

eliminating those candidates with a first value below a predetermined threshold value, thereby generating a second group of candidates, which is smaller than the first group;

comparing the job candidate's skills, competencies, and experiences against a networked electronic database of attributes of third parties performing the same job as the candidate is seeking;

calculating a second value based on the comparing of the job candidate's skills, competencies, and experiences against the database of attributes of third parties performing the same job as the job candidate is seeking, wherein the second value is a weighted average;

storing the calculated second value in the memory device;

eliminating those candidates with a second value below a predetermined threshold value, thereby generating a third group of candidates, which is smaller than the second group;

selecting a list of attributes pertinent to the job;

selecting a list of interviewers for each candidate of the third group, wherein the interviewers are selected based on selected attributes pertinent to the job;

assigning at least one attribute from the list of attributes to each interviewer based on the interviewer's expertise;

generating an interview template for each interviewer based on the at least one attribute assigned to each interviewer, wherein an interview template comprises a list of topics and preselected questions from a networked electronic database to discuss with each job candidate of the third group;

scheduling an interview between each interviewer and each job candidate of the third group;

allowing each interviewer to submit electronic feedback describing each candidate's competency in each of the attributes assigned to the interviewer based on the interview between each interviewer and each job candidate;

calculating, for each candidate, a third value based on the feedback received from each interviewer;

storing the calculated third value in the memory device;

eliminating those candidates with a third value below a predetermined threshold value, thereby generating a final group of candidates, which is smaller than the third group;

loading the first value, second value, and the third value from the memory, device into the processor;

calculating a forth value, based upon an average of the first value, second value, and third value; and outputting a hiring recommendation for at least one candidate of the final group based upon the calculating of the forth value.

* * * * *